United States Patent [19]
Stewart

[11] Patent Number: 5,753,834
[45] Date of Patent: May 19, 1998

[54] METHOD AND SYSTEM FOR WEAR TESTING A SEAT BY SIMULATING HUMAN SEATING ACTIVITY AND ROBOTIC HUMAN BODY SIMULATOR FOR USE THEREIN

[75] Inventor: Robert A. Stewart, South Lyon, Mich.

[73] Assignee: Lear Corporation, Southfield, Mich.

[21] Appl. No.: 899,313

[22] Filed: Jul. 23, 1997

Related U.S. Application Data

[62] Division of Ser. No. 770,704, Dec. 19, 1996, Pat. No. 5,703,303.

[51] Int. Cl.⁶ .................................................. G01N 3/56
[52] U.S. Cl. .................................... 73/865.3; 901/2
[58] Field of Search ............................ 73/865.3, 865.9; 348/92, 94; 364/474.16, 474.17

[56] References Cited

U.S. PATENT DOCUMENTS

| | | |
|---|---|---|
| 2,670,627 | 3/1954 | Shaw . |
| 3,592,041 | 7/1971 | Spencer . |
| 3,841,163 | 10/1974 | Daniel . |
| 4,254,433 | 3/1981 | Dewar, Jr. et al. . |
| 4,261,113 | 4/1981 | Alderson . |
| 4,320,392 | 3/1982 | Giovinazzo et al. . |
| 4,375,674 | 3/1983 | Thornton . |
| 4,409,835 | 10/1983 | Daniel et al. . |
| 4,438,650 | 3/1984 | Meek . |
| 4,701,132 | 10/1987 | Groesch et al. . |
| 4,873,867 | 10/1989 | McPherson et al. . |
| 5,172,589 | 12/1992 | Witt ............................ 901/50 |
| 5,232,243 | 8/1993 | Blackburn et al. . |
| 5,373,749 | 12/1994 | Strand et al. . |
| 5,379,646 | 1/1995 | Andrzejak et al. . |
| 5,394,766 | 3/1995 | Johnson et al. . |
| 5,474,327 | 12/1995 | Schousek . |

FOREIGN PATENT DOCUMENTS

| | | | |
|---|---|---|---|
| 2358716 | 2/1978 | France | 73/866.4 |
| 508711 | 3/1976 | U.S.S.R. | 73/866.4 |
| 1092373 | 5/1984 | U.S.S.R. | 73/866.4 |

*Primary Examiner*—Ronald L. Biegel
*Attorney, Agent, or Firm*—Brooks & Kushman P.C.

[57] ABSTRACT

A method and system for wear testing a seat by simulating human seating movement utilizing a robot and a robotic human body simulator mounted at a distal end of an arm thereof wherein a seat back surface as well as a seat bottom surface are wear tested without the need of video tape interpretation by a user of the system. Measured data is obtained by measuring 3-D locations of parts of a human during ingress of the human onto a calibration seat and egress of the human from the calibration seat. The measured data represents locations of the parts of the human. A control program is generated on the measured data by transforming the measured data to control program targets. Load and/or pressure feedback is provided for control program verification. The simulator includes a plurality of drives which receive drive control signals from a robot controller for moving a trunk and thigh parts of the simulator relative to and independent of one another to test wear characteristics of the seat bottom surface and the seat back surface of the seat under test for a plurality of cycles.

12 Claims, 4 Drawing Sheets

METHOD AND SYSTEM FOR WEAR TESTING A SEAT BY SIMULATING HUMAN SEATING ACTIVITY AND ROBOTIC HUMAN BODY SIMULATOR FOR USE THEREIN

CROSS-REFERENCE TO RELATED APPLICATIONS

This is a divisional of application Ser. No. 08/770,704 filed on Dec. 19, 1996; now U.S. Pat. No. 5,703,303.

This application is related to U.S. applications entitled "Method and System for Creating Time-Lapse Records of Wearout of a Plurality of Parts", U.S. application Ser. No. 08/730,899, and "Method and System for Creating A Time-Lapse Record of Wearout of a Part", U.S. application Ser. No. 08/730,897, both filed on Oct. 18, 1996, and assigned to the same assignee as the assignee of the present application.

1. Technical Field

This invention relates to methods and systems for wear testing parts and, in particular, to methods and systems for wear testing seats such as automotive seats by simulating human seating activity and a robotic human body simulator for use therein.

2. Background Art

Durability tests performed by apparatus such as sliding entry machines or other chair testing apparatus are common. For example, the U.S. Pat. No. to Spencer, 3,592,041, discloses a chair testing apparatus for testing the durability and wear characteristics of a chair. The test apparatus includes a number of weight pads that engages a seat bottom portion and a seat back portion of the chair in a continuous cycling motion.

The U.S. Pat. No. to Shaw, 2,670,627 discloses an apparatus for testing the resistance of textile fabric to abrasion, flexing and creasing.

The U.S. Pat. No. to Strand et al., 5,373,749, discloses a tester for applying forces to a back portion of a vehicle seat.

The U.S. Pat. No. to Andrzejak, 5,379,646 discloses a robotic seat back load-applying device that is capable of applying static and control loading along various points of an automobile seat back.

The above noted patent applications describe systems for durability simulations based upon gross movement of the occupant's buttocks on a seat to be tested. Consequently, the systems incompletely represent the human interface to such seats.

Some multi-axis systems rely upon a programmer's expertise in the translation of video images for machine programming of the systems. Such systems also have no feedback loop with which to verify proper simulator loading of the seat.

U.S. Pat. No. 3,841,163 discloses a test dummy indicating system.

U.S. Pat. Nos. 4,873,867; 4,701,132; 4,409,835 and 4,261,113 disclose test dummies that represent the back, buttocks and legs of the human body.

U.S. Pat. No. 4,438,650 discloses a test mannequin which is shaped to correspond to the upper legs, buttocks, and back of a human.

The U.S. Pat. No. to Johnson et al., 5,394,766, discloses a plastic human torso that simulates the size, appearance, and movement of a human torso.

The forces and torques encountered by a robot arm can be measured directly by using a wrist force sensor, which basically consists of a structure with some compliant sections and transducers that measure the deflections of the compliant sections. The most common transducer used for this purpose is the strain gage, others being piezoelectric, magnetostrictive, magnetic, and so on. For example, the U.S. Pat. No. to Giovinazzo et al., 4,320,392, discloses a transducer which has six degrees of freedom and is arranged to output electrical signals indicative of the forces and movements applied thereto.

Forces and torques can also be sensed indirectly by measuring the forces acting on the joints of a manipulator. For joints driven by DC electric motors, the force is directly proportional to the armature current; for joints driven by hydraulic motors, it is proportional to back pressure.

Some scientific studies of human movement have relied on markers affixed to the body of the subject. These markers can then be tracked over time to reveal the patterns of movement of various parts of the body.

Marking points of interest such as the joints of the body is only the first step in analyzing human movement. Before any analysis can occur, the markers must be detected and their position measured. Such measurement can be tedious and time-consuming. For example, athletes participating in early film studies of human motion wore X's on their joints while throwing a football or carrying out some other athletic task. Researchers then went through the films frame by frame, digitizing the positions of the X markers to get the data required to analyze force, acceleration, and so on.

The measurement of marker position has been automated in various ways. One example is the approach described in the U.S. Pat. No. to Thornton, 4,375,674. Thornton's kinesimetric apparatus relies upon one or more incandescent lamps affixed to the subject's body as markers. The 3-D position of each marker is determined through triangulation, given the output signals of a number of video cameras focused on the subject. This makes it possible to build up a movement envelope over time for each marker.

The use of marker shape to provide 3-D information without triangulation or multiple sensors is proposed by the U.S. Pat. No. to Spackova et al., 4,539,585. An equilateral triangle is affixed to a subject who is to be photographed by a video camera. As the subject turns from side-to-side, the apparent shape of the triangle will change. A computer determines orientation from the amount of changes.

What all of these approaches have in common is the use of markers or signal sources which are worn or held by the person whose movements are being measured.

A number of other devices exist which rely on a human operator to identify features of interest after the fact. In such a system, the subject wears no markers while his or her image is being recorded. Instead, an operator marks the specified features by using a light pen or similar device.

The U.S. Pat. No. to Dewar, Jr. et al., 4,254,433, discloses a visual motion tracking system wherein movement of an article is monitored by providing a patterned target to move with the object. A solid state line scan camera views the pattern of the target as it moves relative to the camera and the electronic output of the camera representing the light and dark areas of the target is analyzed by an electronic circuit to determine the movement of the target and therefore of the object being monitored. The resulting electronic signal representing the motion of the object is useful for coordinating the movement of a robot which is operating upon the object during its movement.

Qualisys, Inc. of Glastonbury, CT sells a kinematic measurement product called a PC Reflex 3D 60 Motion Measurements System. The system is designed to measure the motion of subjects in real-time and produce both qualitative and quantitative results within a matter of seconds. The system includes the following components:

1. Multiple position sensors (camera systems) each of which includes a specially designed video camera and a specially designed video processor.
2. Software which enables the user to set up a desired field of view of the position sensors, calibrate the desired field of view, and process in real-time the measured spatial coordinates (x,y) of target markers which are attached to a subject in the calibrated field of view.
3. Passive reflective target markers-come in various sizes and shapes. Standard Scotchlite 3M™ reflective paint can also be used.
4. A calibration frame which is used so that the volume of the desired field of view can be calibrated using software calibration routines.

Seat force sensors embedded within a seat to obtain electrical signals representative of force or weight experienced at various locations on the seat are well known. For example, the U.S. Pat. No. to Blackburn et al., 5,232,243, discloses film-like occupant position and weight sensors.

The U.S. Pat. No. to Schousek, 5,474,327, discloses a seat pressure sensor comprising eight variable resistance pressure sensors embedded in a seat cushion. The response of each sensor to occupant pressure is monitored by a microprocessor which calculates total weight and weight distribution.

SUMMARY OF THE INVENTION

An object of the present invention is to provide a method and system for wear testing a seat by accurately simulating human seating activity not only on a seat bottom, but also on a seat back of the seat during simulated vehicle ingress/egress.

Another object of the present invention is to provide a method and system for wear testing a seat utilizing a robotic human body simulator which accurately simulates upper leg (thigh), buttock and back interaction with the seat under test.

Still another object of the present invention is to provide a method and system for wear testing a seat by accurately quantifying actual human movement at numerous 3-D locations relative to the seat under test during simulated vehicle ingress/egress.

Yet still another object of the present invention is to provide a method and system for wear testing a seat wherein proper testing of the seat by a robotic human body simulator is verified through accurate body pressure mapping of the simulator.

In carrying out the above objects and other objects of the present invention, a method is provided for wear testing a seat by simulating human seating activity. The method includes the steps of providing a robot, including an arm with a robotic body simulator connected at a distal end thereof and measuring 3-D locations of parts of a human during ingress of the human onto a calibration seat and egress of the human from the calibration seat to obtain measured data representing locations of the parts of the human. The method also includes the steps of generating a control program based on the measured data, and repeatedly driving the robot arm and the robotic human body simulator between a withdrawn position and a seat-surface engaging position based on the control program to test wear characteristics of a seat bottom surface and a seat back surface of the seat under test for a plurality of cycles.

Preferably, the step of measuring includes the step of scanning a three-dimensional field of view occupied by the human and the calibration seat and taking successive images of the field of view.

Also, preferably, the method further includes the step of measuring force exerted by the human on the calibration seat during the ingress and egress to obtain force exertion data.

Yet, still preferably, the method includes the step of attaching target markers to the parts of the human and wherein the measured data represents locations of the target members on the parts of the human.

Still, preferably, the step of generating includes the step of transforming the measured data into control targets representing the parts of the human.

Preferably, the step of measuring also measures 3-D locations of parts of the calibration seat and wherein the measured data also represents locations of the parts of the calibration seat.

Further in carrying out the above objects and other objects of the present invention, a system is provided for wear testing a seat by simulating human seating activity. The system includes a robot including an arm having a distal end and at least one arm drive for moving the arm and a robotic human body simulator connected to the distal end of the arm for wear testing a seat bottom surface and a seat back surface of the seat under test. The simulator includes thighs adapted to engage the seat bottom surface, a trunk pivotally connected to the thighs and adapted to engage the seat bottom surface and the seat back surface and a plurality of simulator drives for moving the trunk and thighs relative to and independent of one another. The system further includes a controller coupled to the arm drive(s) and the plurality of simulator drives and programmed with a control program to generate drive control signals so that the at least one arm drive and the plurality of simulator drives independently move the arm and the thighs and trunk of the simulator, respectively, repeatedly between a withdrawn position and a seat surface engaging position to test wear characteristics of the seat bottom surface and the seat back surface for a plurality of cycles.

Preferably, the controller stores force exertion data representative of forces exerted on a calibration seat by a human during actual human seating activity. The system further includes a force measuring device coupled to the controller to generate signals indicative of forces applied to the simulator during the wear testing. The controller processes the signals and the force exertion data to verify the control program.

Still, preferably, the signals are also indicative of moments applied to the simulator during the wear testing; the force measuring device is a transducer coupled to the simulator at the distal end of the arm; and the transducer is a load cell which has six degrees of freedom.

Yet, still further in carrying out the above objects and other objects of the present invention, a robotic human body simulator is provided for wear testing a seat. The simulator includes thighs adapted to engage a seat bottom surface, a trunk pivotally connected to the thighs and adapted to engage the seat bottom surface and a seat back surface, and a plurality of simulator drives adapted to receive drive control signals for moving the trunk and thighs relative to and independent of one another to test wear characteristics of the seat bottom surface and the seat back surface for a plurality of cycles.

Preferably, the trunk includes a back and buttocks pivotally connected to the back. One of the plurality of drives moves the back relative to and independent of the buttocks.

Also, preferably, each of the thighs is pivotally connected to the buttocks. Each of the thighs is moved by another one of the plurality of drives relative to and independent of the buttocks.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
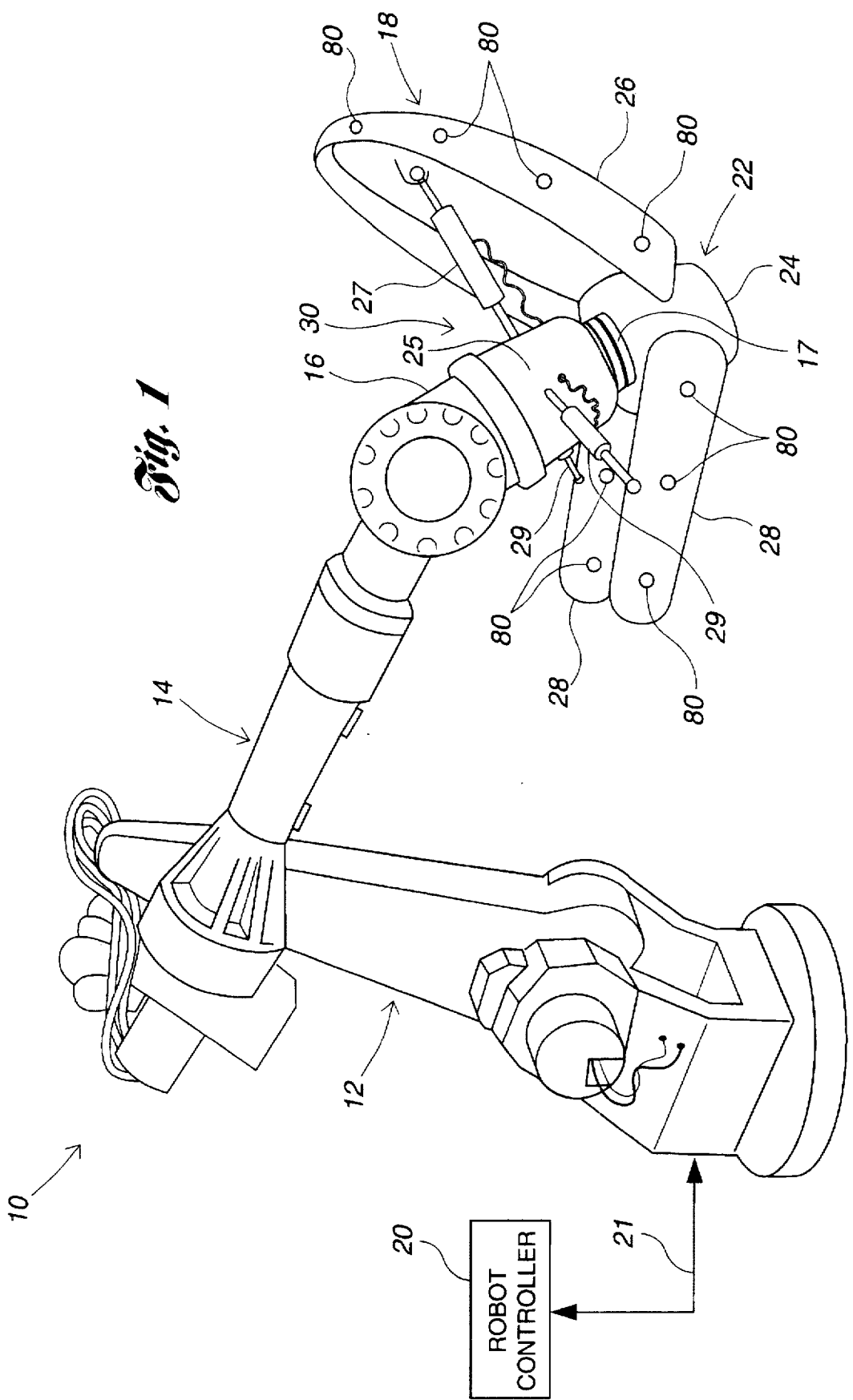
FIG. 1 is a schematic diagram illustrating a system including a robot and a robotic human body simulator constructed in accordance with the present invention.

Referring now to the drawing Figures, there is illustrated in FIG. 1 a system, generally indicated at 10, for wear testing a seat by simulating human seating activity. The system 10 preferably includes a multiaxis electric robot, generally indicated at 12, including an arm, generally indicated at 14. At a distal end 16 of the arm 14, there is mounted by a connector 17 an end effector in the form of a robotic human body simulator, generally indicated at 18, for wear testing a seat bottom surface and a seat back surface of an automotive seat.

The system 10 also includes a conventional robot controller 20 which is electrically coupled to electric servo motor drives of the robot 12 and the simulator 18 by a bi-directional cable 21. The robot controller 20 is programmed with a control program to generate drive control signals for use by the electric servo motor drives of the robot 12 and the simulator 18 so that the arm drives and the simulator drives independently move the arm 14 and the simulator 18 repeatedly between a withdrawn position and a seat surface engaging position to test wear characteristics of the seat bottom surface and the seat back surface during the movement for a plurality of cycles.

In particular, the simulator 18 includes a trunk, generally indicated at 22, having buttocks 24 and a back 26 hingedly connected thereto so that the back 26 can move independently of the buttocks 24 during extension and retraction of an electric actuator or drive 27. In FIG. 1, the drive 27 takes the form of a cylinder, one end of which is pivotally connected to an inner surface of the back 26 and the other end of which is connected to a housing 25 of a device 30 described below.

The simulator 18 also includes upper legs or thighs 28 which are pivotally connected to the buttocks 24 by means of ball joints. Each of the thighs 28 is also controllably driven by its own respective electric drive or actuator 29 in the same fashion as the actuator 27 drives the back 26.

The system 10 also includes a force measuring device, generally indicated at 30, which is electrically coupled to the robot controller 20 by the cable 21. The device 30 is coupled to the simulator 18 at the distal end 16 of the robot arm 14 to generate electrical signals indicative of forces and moments applied to the trunk 22 and the thighs 28 of the simulator 18 during wear testing of the seat back surface and the seat bottom surface of a seat under test. The robot controller processes the signals together with force exertion data, whose generation will be described hereinbelow, to verify the control program by which the robot controller 20 controls not only the robot 12, but also the simulator 18. Preferably, the force measuring device 30 is a transducer or load cell having six degrees of freedom wherein the electrical signals generated by the device 30 are indicative of the forces and moments applied to the device 30 through the simulator 18. These forces are typically reaction forces exerted on the simulator 18 during the wear testing.

Instead of the device 30, alternatively, the forces and moments can be sensed indirectly by measuring the forces acting on the joints of the robot 12. As previously mentioned, for joints driven by DC electric motors, the forces are directly proportional to armature current. For joints driven by hydraulic motors (i.e.: for hydraulic robots), the forces are proportional to back pressures.

Figure 2:
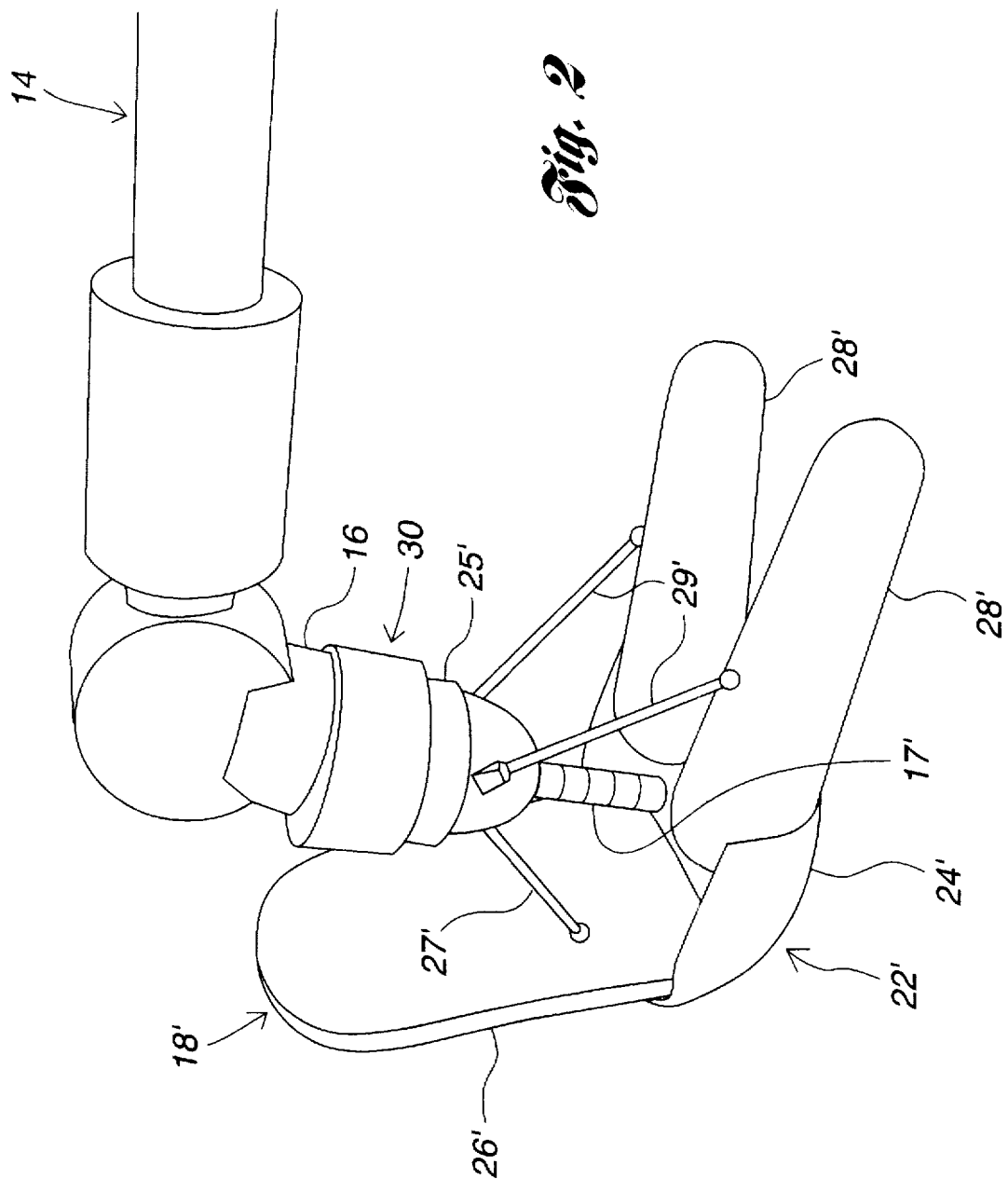
FIG. 2 is a partially broken away schematic diagram of a second embodiment of a robotic human body simulator mounted at a distal end of a robot arm.

Referring now to FIG. 2, there is illustrated a second embodiment of a robotic human body simulator, generally indicated at 18', also connected at the distal end 16 of the robot arm 14 by a connector 17' and the force measuring device 30. The simulator 18' is similar in form and function to the simulator 18 of FIG. 1 and, consequently, the different parts of the simulator 18' have the same reference numeral as corresponding parts of the simulator 18 except they have a prime designation. However, the simulator 18', which is a preferred form of the robotic human body simulator of the present invention, includes push-pull drive cables 27' and 29' instead of the actuators 27 and 29, respectively.

For example, the drive cable 27' is secured at a free end thereof to a back 26' of the simulator 18'. The opposite end of the cable 27' is connected to its respective compact electric servo drive contained within a housing 25' of the device 30. When the servo drive for the back 26' within the housing 25' receives a control signal from the controller 20, the servo drive alternately plays out or rewinds the cable 27' to allow the back 26' to pivot with respect to the thighs 28'. In the embodiment of FIG. 2, the back 26' of the simulator 18' is preferably pivotally connected to the buttocks 24' to pivot relative to the buttocks 24'.

In the same fashion, each of the thighs 28' is pivotally connected to the buttocks 24' so that when the respective electric servo drives contained within the housing 25' play out their respective cables 29', the thighs 28' rotate away from the buttocks 24'. Upon rewinding the cables 29', the servo drives pivot the thighs 28' back towards the buttocks 24'.

Figure 3:
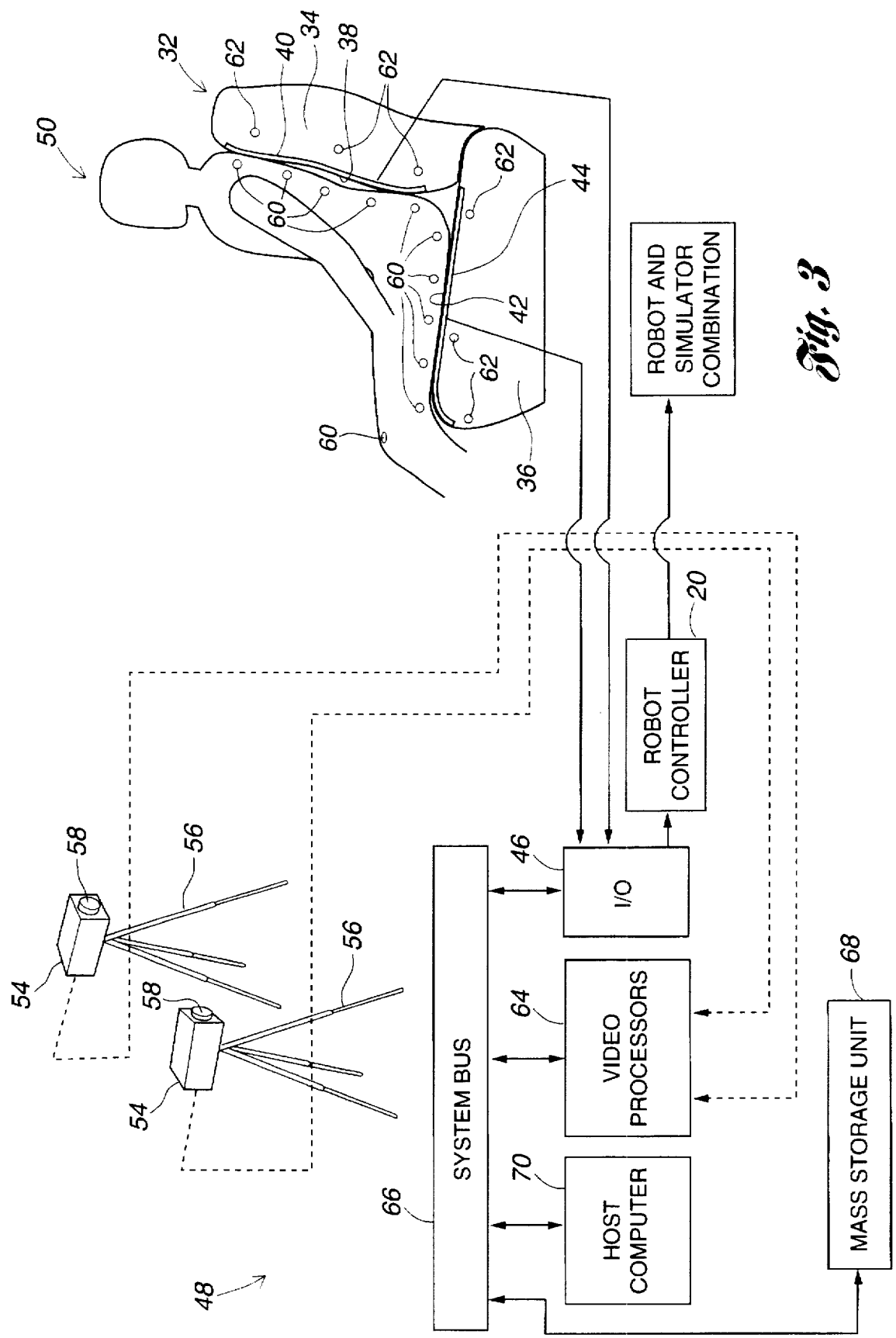
FIG. 3 is a schematic block diagram illustrating a system for generating force exertion data and a control program for use by the system of the present invention.

Referring now to FIG. 3, there is illustrated in schematic block diagram form a system for generating force exertion data and a control program for use by the robot controller 20 of the present invention. A calibration automotive seat assembly, generally indicated at 32, includes a seat back 34 and a seat bottom 36. The seat back 34 includes a seat back surface 38 such as a fabric layer which covers seat back force sensors 40 embedded within a cushion of the seat back 34. The sensors 40 generate electrical signals representative of force or weight experienced at various locations at the seat back 34 as is well known in the art.

In like fashion, the seat bottom 36 includes a seat bottom surface in the form of a fabric layer, for example, which covers seat bottom force sensors 44 also embedded within a cushion of the seat bottom 36. Like the sensors 40, the sensors 44 also generate electrical signals representative of force or weight experienced or exerted at various locations on the seat bottom by a human as is well known in the art.

The electrical signals generated by the sensors 40 and 44 are received by input/output circuits 46 of a machine control system, generally indicated at 48. A key subsystem of the system 48 is a 3-D measurement or motion capture system 52 (i.e. FIG. 4). The system 52 measures 3-D locations of parts of a human 50 during ingress of the human 50 onto the calibration seat assembly 32 and egress of the human 50 from the seat assembly 32 to obtain measured data representing locations of the parts of the human 50. Preferably, the parts are the knees, the hips, and the shoulder of the human 50 which are measured in order to simulate upper leg, buttocks, and back interaction of the human 50 with the seat assembly 32 as will be described in greater detail hereinbelow.

The 3-D measurement system 52 generally measures the motion of the human subject in real-time and produces both qualitative and quantitative results. The system 52 includes two or more position sensors in the form of video cameras 54 mounted on tripods 56. Each video camera 54 is preferably a standard CCD video camera which is modified for operation in the infrared wavelength region. An array of infrared light-emitting diodes surrounds a lens 58 of each of the cameras 54. The diodes provide bursts of infrared light to illuminate markers 60, which are preferably passive markers, attached at strategic locations on the human 50. In this way, the passive markers 60 become the brightest images in the fields of view of the cameras 54.

Preferably, a variety of standard lenses can be attached to the cameras 54 to provide the user with a field of view from 53 degrees to 70 degrees. Each lens 58 is set up for operation in the infrared range.

The reflective markers are preferably half or full spheres with a layer of standard reflective paint manufactured by the 3M Corporation and is preferably their Scotchlite™ reflective liquid 7200 series.

Figure 4:
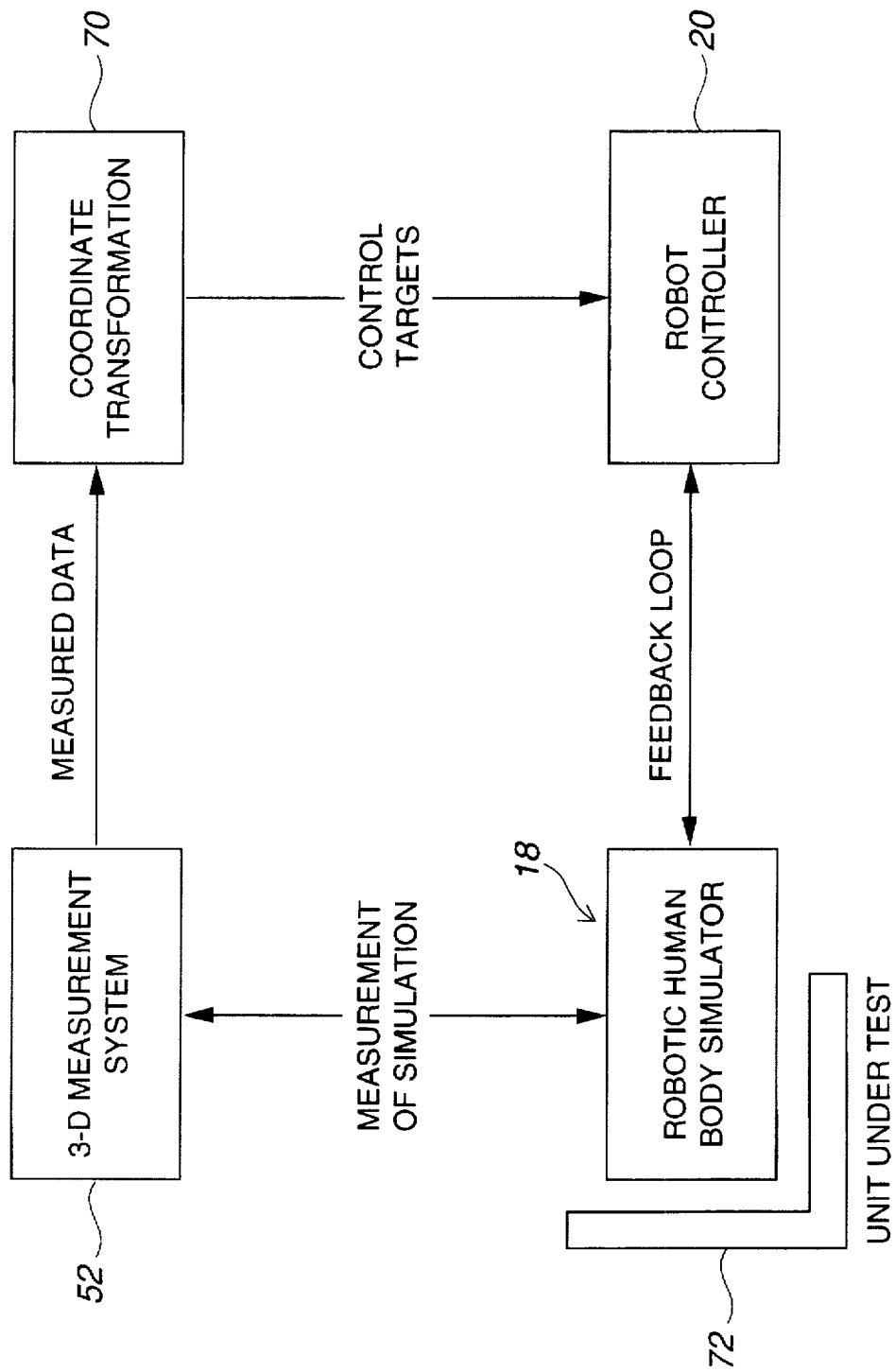
FIG. 4 is a schematic block diagram including data flow paths and illustrating the method and system of the present invention.

The cameras 54 scan a three dimensional field of view occupied by the human 50 and the seat assembly 32, which also includes strategically placed reflective markers 62 for reference purposes. The 3-D measurement system 52 provides measured data, as indicated in FIG. 4, from the images generated by the cameras 54 which images are input to respective video processors 64. Each video processor 64 detects the reflective markers 60 and 62 which are attached to the human 50 and the seat assembly 32, respectively, and calculates the center or centroid of each of the markers 60 and 62. From the centroids of each of the markers 60 and 62 the video processor calculates digital x,y coordinates of the markers 60 and 62. In this way, each image (i.e. the field of view containing the reflective markers 60 and 62) is scanned, the centroids are calculated, and the resulting x,y coordinates are presented to the remainder of the system 48 at a system bus 66 described below.

Preferably, a user of the system 48 sets up a desired field of view for the cameras 54 by calibrating the desired field of view to include the human 50 and the seat assembly 32 so that the rest of the system 48 can process in real-time measured spatial x,y coordinates of the target markers 60 and 62. Preferably, for the 3-D measurements, a calibration frame is used so the volume of the field of view, including the human 50 and the seat assembly 32, is calibrated.

Preferably, the rest of the system 48 includes a system bus 66 which may be either a PCI on EISA, ISA or VL system bus, or any other standard bus to allow intersystem communication such as with the robot controller 20.

The system 48 may be programmed at a mass storage unit 68 to include custom controls for image processing and image analysis. For example, as indicated at block 70 in FIG. 4, a coordinate transformation is performed on the measured data to obtain control targets which represent the parts of the human 50 such as the upper leg, buttocks, and back of the human 50.

A host computer 70 of the system 48 may be a Pentium-based IBM compatible PC or other PC having a sufficient amount of RAM and hard disk space for performing the algorithms associated with generating the control targets for the robot controller 20 and for generating force exertion data for the robot controller 20 from signals provided by the sensors 40 and 44. In this way, the robot controller 20 is able to store therewithin a control program and a body pressure map corresponding to human movements during vehicle or seat ingress and egress.

Referring now to FIG. 4, there is illustrated a schematic block diagram including data flow paths illustrating the method and system of the present invention. The 3-D measurement system 52 is used to measure human movement data during an ingress/egress event. The three dimensional movement is measured typically at the knees, hip, shoulder, and seat locations. The measured data is transformed into a group of coordinated 3-D displacement targets or control targets as indicated by the coordinate transformation block 70, which control targets represent knees, hips, and shoulders of the human. Because the robotic human body simulator 18 has independent leg, hip and back movements which correspond with the measured displacements, the robot controller 20 is capable of driving the compact electric actuators contained within the simulator 18 to simulate human seating activity.

In other words, an individual's ingress/egress movements onto and off, respectively, of a calibration seat assembly 32, as indicated in FIG. 3, are recorded using the 3-D measurement system 52. The recorded points include knees, hips, shoulders, and reference points (indicated by markers 62) on the seat assembly 32.

At the same time, a body pressure distribution obtained from signals generated by the sensors 40 and 44 is also recorded for control program verification.

A mathematical coordinate transformation indicated at block 70 is performed on the measured data by the programmed host computer 20 to obtain a target program in the form of control targets. The control targets are used by the robot controller 20 to obtain the control program which generates drive control signals for the robot arm drives and the compact actuators contained within the robotic human body simulator 18 or 18'.

The transformed data set or control targets are preferably played out by the robot 12 and the simulator 18 using an iterative scheme until the desired testing motions are achieved. Load and/or pressure measurements are made on a seat or unit-under-test 72 through the use of the load cell 30 and compared to the body pressure distribution previously stored within the robot controller 20 for control program verification. Further verification of playback fidelity can be accomplished through the 3-D measurement system 52 using the robotic human body simulator 18 with markers 20 affixed thereto (i.e. FIG. 1) and comparing the measured data generated thereby with the original calibration measured data.

While the best mode for carrying out the invention has been described in detail, those familiar with the art to which this invention relates will recognize various alternative designs and embodiments for practicing the invention as defined by the following claims.

What is claimed is:

1. A method for wear testing a seat by simulating human seating activity, the method comprising the steps of:

providing a robot, including an arm with a robotic human body simulator connected at a distal end thereof;

measuring 3-D locations of parts of a human during ingress of the human onto a calibration seat and egress of the human from the calibration seat to obtain measured data representing locations of the parts of the human;

generating a control program based on the measured data; and repeatedly driving the robot arm and the robotic human body simulator between a withdrawn position and a seat-surface engaging position based on the control program to test wear characteristics of a seat bottom surface and a seat back surface of the seat under test for a plurality of cycles.

2. The method of claim 1 wherein the step of measuring includes the step of scanning a three-dimensional field of view occupied by the human and the calibration seat and taking successive images of the field of view.

3. The method of claim 2 wherein the step of scanning is performed by a plurality of cameras.

4. The method of claim 2 wherein the step of measuring further includes the step of converting the images into the measured data.

5. The method of claim 1 further comprising the step of measuring force exerted by the human on the seat during the ingress and egress to obtain force exertion data.

6. The method as claimed in claim 5 further comprising the steps of:

generating signals indicative of forces applied to the simulator during the step of repeatedly driving; and processing the signals and the force exertion data to verify the control program.

7. The method of claim 6 wherein the electrical signals are also indicative of moments applied to the simulator during the wear test.

8. The method of claim 1 further comprising the step of attaching target markers to the parts of the human and wherein the measured data represents locations of the target members on the parts of the human.

9. The method of claim 8 wherein the target markers are passive target markers.

10. The method of claim 8 wherein the step of measuring includes the steps of:

detecting the target markers; and calculating the locations of the detected target markers to obtain the measured data.

11. The method of claim 1 wherein the step of generating includes the step of transforming the measured data into control targets representing the parts of the human.

12. The method of claim 1 wherein the step of measuring also measures 3-D locations of parts of the calibration seat and wherein the measured data also represents locations of the parts of the calibration seat.

* * * * *